(12) United States Patent
Wan et al.

(10) Patent No.: US 11,965,737 B2
(45) Date of Patent: Apr. 23, 2024

(54) DETERMINING PLASTIC OR CELLULOSE LEVELS IN COMPOSITES

(71) Applicant: Continuus Materials Intellectual Property, LLC, The Woodlands, TX (US)

(72) Inventors: Victoria L. Wan, Philadelphia, PA (US); Jack G. Winterowd, Puyallup, WA (US); Richard Schnarre, Metuchen, NJ (US)

(73) Assignee: Continuus Materials Intellectual Property, LLC, The Woodlands, TX (US)

( * ) Notice: Subject to any disclaimer, the term of this patent is extended or adjusted under 35 U.S.C. 154(b) by 304 days.

(21) Appl. No.: 17/139,556

(22) Filed: Dec. 31, 2020

(65) Prior Publication Data
US 2022/0205774 A1 Jun. 30, 2022

(51) Int. Cl.
*G01B 7/06* (2006.01)

(52) U.S. Cl.
CPC .................. *G01B 7/085* (2013.01)

(58) Field of Classification Search
CPC ....... G01B 7/085; G01N 27/221; B07C 5/344
USPC .......................................................... 324/671
See application file for complete search history.

(56) References Cited

U.S. PATENT DOCUMENTS

| | | | |
|---|---|---|---|
| 6,281,679 B1 * | 8/2001 | King ..................... | G01B 21/08 324/229 |
| 6,388,452 B1 | 5/2002 | Picciotto | |
| 8,201,692 B2 | 6/2012 | Valerio | |
| 8,791,707 B2 | 7/2014 | Bowler et al. | |
| 9,689,822 B2 * | 6/2017 | King ..................... | G01N 27/221 |
| 10,406,564 B1 | 9/2019 | Al-Ateeq | |
| 2010/0126913 A1 | 5/2010 | Valerio | |
| 2018/0233298 A1 * | 8/2018 | Glavicic ................ | H05K 1/036 |
| 2019/0271157 A1 * | 9/2019 | Baggs ..................... | B32B 3/02 |
| 2020/0251290 A1 | 8/2020 | Glavicic | |
| 2022/0205774 A1 | 6/2022 | Wan et al. | |

FOREIGN PATENT DOCUMENTS

EP 4 024 042 A1 7/2022

OTHER PUBLICATIONS

"Tutorial—Using Capacitive Soil Moisture Sensors on the Raspberry Pi"; https://www.switchdoc.com/2020/06/tutorial-capacitive-moisture-sensor-grove/; webpage accessed on Dec. 3, 2020; pp. 1-12.

* cited by examiner

*Primary Examiner* — Alesa Allgood
*Assistant Examiner* — Byung Ro Lee
(74) *Attorney, Agent, or Firm* — Foley & Lardner LLP

(57) ABSTRACT

A non-destructive and non-contact test system quantifies the cellulose and/or plastic content in a given composite material board sample using capacitive sensors. The system includes a ground plate and a capacitive sensor probe system with programmed instructions to calibrate to a predetermined dielectric, determine, in a composite board placed in between the capacitive sensor and the ground plate, an equivalent thickness of material emitting the predetermined dielectric, and convert the equivalent thickness into a weight percentage of the material in the board.

21 Claims, 9 Drawing Sheets

DETERMINING PLASTIC OR CELLULOSE LEVELS IN COMPOSITES

BACKGROUND

The following description is provided to assist the understanding of the reader. None of the information provided or references cited is admitted as prior art.

Some building products manufacturers produce composites comprised of plastic, cellulose, and other components. The amount of plastic and/or cellulose in the composite can impact the properties of the composite. Thus, as part of a quality control program, it is useful to estimate the amount of plastic and/or cellulose in the finished product. It is especially helpful to be able to do this in "real-time" on the production line. Currently, no non-destructive, simple-to-use, test to measure plastic or cellulose content, as a percentage of a composite, exists. Available tests to determine plastic or cellulose content of a matrix require the destruction of finished goods, high heat and/or complex costly equipment.

Composites derived from waste streams require a series of characterization, sorting, and screening to collect valuable materials. Waste and recycling industries rely on various sorting technologies to separate valuable cellulosic and plastic materials from waste. A common way of measuring cellulose and/or plastic content in composite materials involves characterizing all the materials that end up in the composite materials using infrared devices, such as a near-infrared (NIR) spectrometer. However, such devices have an output of surface area of the material evaluated. In order to determine the cellulose and/or plastic content in a composite material from NIR data, the measurement output signal must be directly coupled to a specific unit of production. There has to be 100% machine and process efficiency for the paper to plastic level measurement to be a true depiction of a specific unit of the finished product.

SUMMARY

In accordance with some aspects of the present disclosure, a system is disclosed. The system includes a displacement-type capacitive sensor and programmed instructions that when executed determine an amount of plastic or cellulose in a sample. The displacement-type capacitive sensor includes a ground plate, a grounding wire, an amplifier, a low-noise extension cable (e.g., a triaxial and/or coaxial cable), and a capacitive sensor probe. An example of a displacement-type capacitive sensor is the Accumeasure D200 Digital Capacitance System by MTI Instruments Incorporated [Albany, NY]. A procedure for determining an amount of plastic or cellulose in a sample using the system involves 1) placing a section of composite material, having a known thickness and weight, between the capacitive sensor probe and a ground plate, 2) measuring the dielectric response, 4) calculating or computing the amount of plastic or cellulose in the sample. In some embodiments, the procedure is automated. In other embodiments, the capacitive response is expressed as an "equivalent thickness of plastic" or "equivalent thickness of cellulose" in the composite material sample. In still other embodiments, the capacitive response is expressed as an "equivalent weight of plastic" or "equivalent weight of cellulose" in the composite material sample.

In accordance with some aspects of the present disclosure, another system is disclosed. The system provides a non-destructive test to analyze the cellulose and/or plastic content in a composite sample by the use of a displacement-type capacitive sensor, an amplifier, a ground plate, a grounding wire, and a processor. The system can further include a user interface, and a processor with programmed instructions to measure output voltage from the capacitance sensor system and convert said voltage to a thickness value, wherein the thickness represents the thickness of the material of interest (plastic or cellulose) that would exist if the composite was composed only of the material of interest. In some embodiments, the results of this calculation can be associated with a "passing" or "failing" assignment as part of a quality control system.

In accordance with some other aspects of the present disclosure, a computer-implemented method is disclosed. The method includes a non-destructive test to analyze the plastic content and/or the cellulose content in a given composite material sample by the use of displacement-type capacitive sensors and a processor. The method includes sending, by a processor and to a displacement-type capacitive sensor coupled to the processor, an instruction to measure, in a composite material sample placed underneath the sensor, a capacitive response specific to a dielectric constant, which can be used in conjunction with previously established standards, to calculate the amount of cellulose and/or plastic in the composite. The results of this calculation can be compared to certain established cellulose or plastic level specifications to determine whether or not compliance has been achieved. The results of this assessment can be expressed as either a passing or failing assignment and can be sent to a user interface coupled to the processor.

The foregoing summary is illustrative only and is not intended to be in any way limiting. In addition to the illustrative aspects, embodiments, and features described above, further aspects, embodiments, and features will become apparent by reference to the following drawings and the detailed description.

Figure 1A:
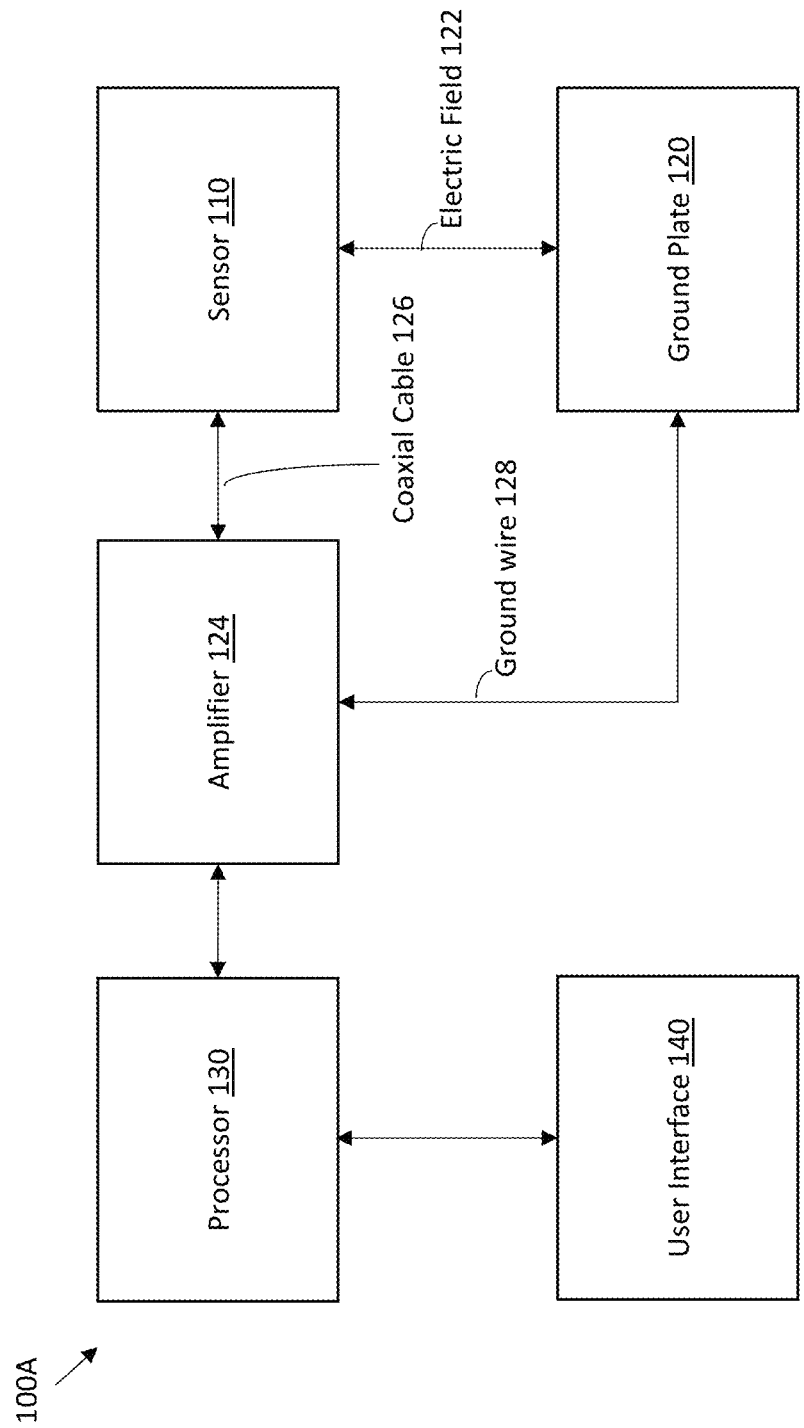
FIG. 1A is an example block diagram of a system that determines cellulose and/or plastic content in a roofing coverboard, in accordance with some embodiments of the present disclosure.

The foregoing and other features of the present disclosure will become apparent from the following description and appended claims, taken in conjunction with the accompanying drawings. Understanding that these drawings depict only several embodiments in accordance with the disclosure and are therefore, not to be considered limiting of its scope, the disclosure will be described with additional specificity and detail through use of the accompanying drawings.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

Some manufacturers of composites use surface scanning technology, such as near infrared. This technology is inexpensive and prevalent for material identification. However, the capabilities of surface scanning technology for composite determination by weight are limited. In some cases, the surface composition might not be representative of the composition of a cross-section of the composite material sample. In order to analyze the entire composite material content using NIR technology, the sample must be broken into individual component pieces. One of the biggest challenges the composite industry faces is the ability to assess the entire material composition, throughout the cross-section, rather than just the surface of the composite in a non-destructive manner. Displacement-type capacitive sensing for cellulose or plastic content, as described herein, has the ability to accomplish this objective. Furthermore, displacement-type capacitive sensing can be adapted to achieve "real-time" measurements.

The present disclosure is generally directed to a non-destructive and non-contact test method to analyze the cellulose and/or plastic content in a given composite material sample using displacement-type capacitive sensors. "Capacitance" reflects the ability of a system to hold an electrical charge. Capacitive sensing probes function as a primary capacitor and the target ground plate function as the secondary capacitor. Capacitive sensors function by measuring changes in external capacitance of the electrostatic field that the sensor produces between the composite and the ground and the probe plate. The term capacitance relates to a condition in which a first plate and a second plate (ground plate) are separated by a gap and a voltage is applied across the first plate, which induces an electric field between the two metal plates. The amount of voltage that must be applied to the first metal plate in order to maintain a constant charge is generally assessed by measuring the current used to create the voltage. The material that exists between the plates will impact the capacitance of the charged plate (the amount of charge held by the plate).

Dielectric materials are good insulators since they are poor at conducting electricity. Introducing a dielectric material between a two-plate capacitor system will decrease electric field, thus decreasing the voltage. This dielectric material property is commonly referred to as the "dielectric constant", which is the relative permittivity or the ratio of the capacitance of material to the exact same capacitance of the gap within a vacuum. The dielectric constant of various cellulose types can range from 3.7-7.5 and plastic types range from about 2.25-2.7. In general, $$\text{Capacitance} = (\text{Plate Area})(\text{Dielectric Value of Material in Gap})/(\text{Gap Distance})$$

Capacitance can be rapidly assessed by measuring the amount of current required to maintain a given voltage level on a plate. If the gap between the metal plates is filled with a composite material, and the composite material is comprised of polyethylene plastic and a second component, and the second component has a dielectric value that is meaningfully different than that of the polyethylene plastic, then the capacitance reading will be proportional to the amount of plastic in the composite material. In one suitable example, a composite material could be comprised of polyethylene and cellulose.

FIG. 1A illustrates a system 100A that determines cellulose and/or plastic content in a roofing coverboard (e.g., board). The system 100A includes a sensor 110 and a target plate 120. According to an exemplary embodiment, the sensor 110 is a displacement-type capacitive sensor (e.g., noncontact probe) that uses an electrical field to a ground target (copper ground plate). The sensor 110 can be calibrated to a standard material that has a known dielectric constant. Once the sensor 110 is calibrated, a composite can be placed between the sensor 110 and copper ground target plate 120. This configuration allows a user to assess the composite material for its dielectric response, which can be correlated with the level of cellulose and/or plastic in the composite. In some cases, the dielectric response can be expressed as an "equivalent plastic thickness value". Under these conditions, the plastic level is simply the ratio of the equivalent plastic thickness value relative to the total composite thickness. A voltage is applied across the sensor 110 and the target plate 120 induces an electric field 122 between the sensor 110 and the target plate 120.

The system 100A includes an amplifier 122 coupled to the sensor 110. In some embodiments, the amplifier 122 receives an output voltage from the sensor 110. The amplifier 122 can amplify the output voltage to generate an amplified output voltage. In some embodiments, the amplifier 122 sends the amplified output voltage to the processor 130. In some embodiments, the amplifier 122 is coupled to the sensor 110 by a coaxial cable 126. In some embodiments, the amplifier 122 is coupled to the target plate 120 by a grounding wire 128. In some embodiments, the grounding wire 128 is coupled to a reference voltage (e.g., ground).

The system 100A includes a processor 130 coupled to the amplifier 122. According to an exemplary embodiment, a displacement-type digital capacitance probe system (e.g., multi-channel for multiple probes) can be used with a processor (e.g., the processor 130) that executes a software to convert the output voltage (e.g., the amplified output voltage) to an equivalent thickness measurement according to a specific calibration, indicating a thickness of the cellulose and/or plastic content. In some embodiments, the probe system includes a digital signal processor that digitizes the output voltage and/or the computed equivalent thickness value before sending to one or more processors for further processing. This embodiment enables the development of the method to be based off the calibration of the dielectric of cellulose or plastic. The processor 130 can receive the voltage signal and correlate it to an equivalent cellulose or plastic thickness value, which can be used to calculate the cellulose level or plastic level in the composite. Information required by the processor to conduct this calculation includes the equivalent thickness of the cellulose or plastic, the thickness of the composite, and optionally, the density of the cellulose or plastic and the weight of the composite.

The system 100A includes a user interface 140. The processor 130 calculates results (e.g., weight percentage, volume percentage of the cellulose or plastic content) to be sent to the user interface 140. The processor 130 can compare the cellulose or plastic level results to a cellulose or plastic level specification. Based on the comparison, the processor 130 can determine whether the composite material sample passes the quality control test (e.g., meets the specification) and can send this result to the user interface. The processor 130 can store the results and the pass/fail test results in memory.

Figure 1B:
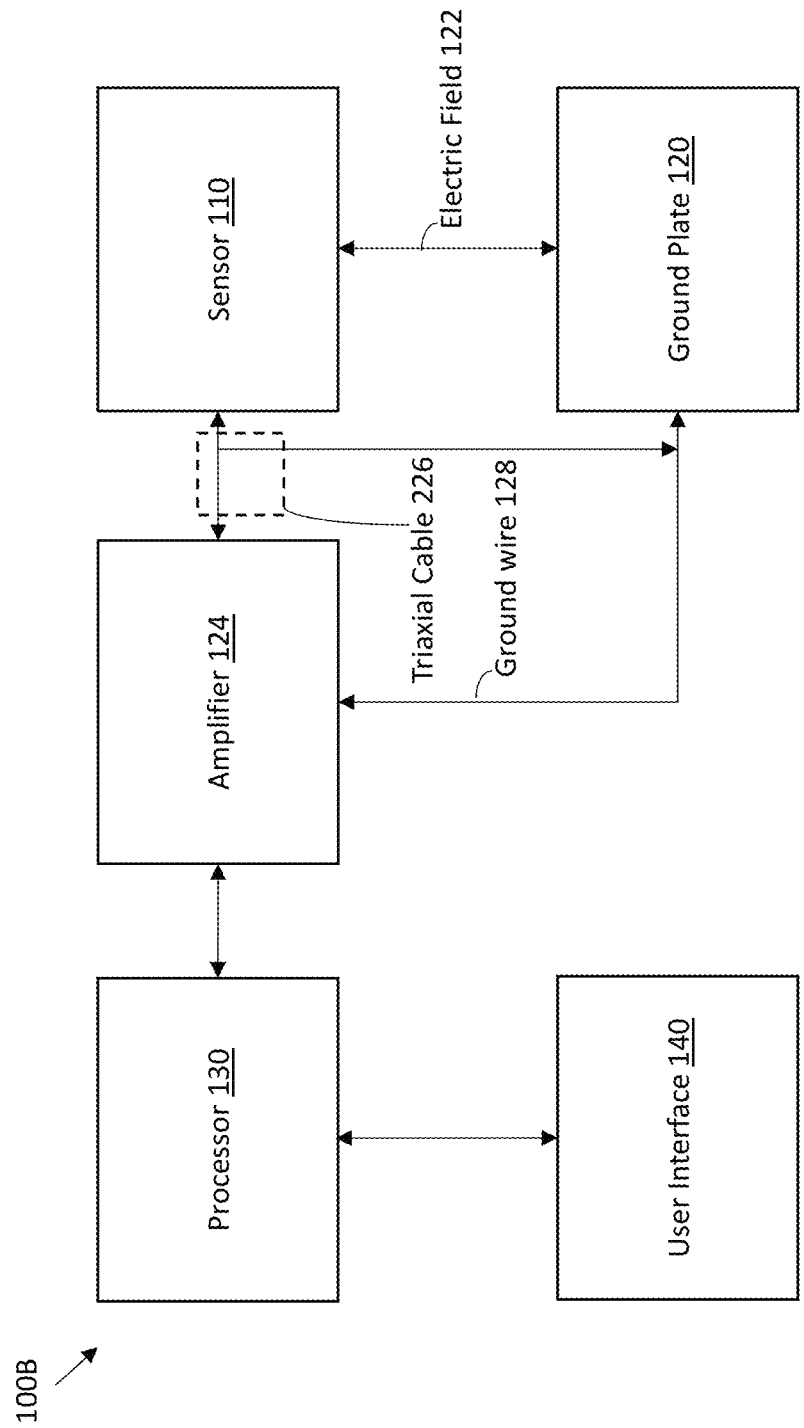
FIG. 1B is an example block diagram of a system that determines cellulose and/or plastic content in a roofing coverboard, in accordance with some embodiments of the present disclosure.

FIG. 1B illustrates a system 100B that determines cellulose and/or plastic content in a roofing coverboard. FIG. 1B is similar to FIG. 1A except that the amplifier 124 is coupled to the sensor 120 with a triaxial cable 226. In some embodiments, one layer of the triaxial cable 226 couples the sensor 120 and the amplifier 124. In some embodiments, a second layer of the triaxial cable 226 is coupled to the grounding wire 128. The triaxial cable 226 may reduce interfering electrical noise included in the output voltage.

Figure 2:
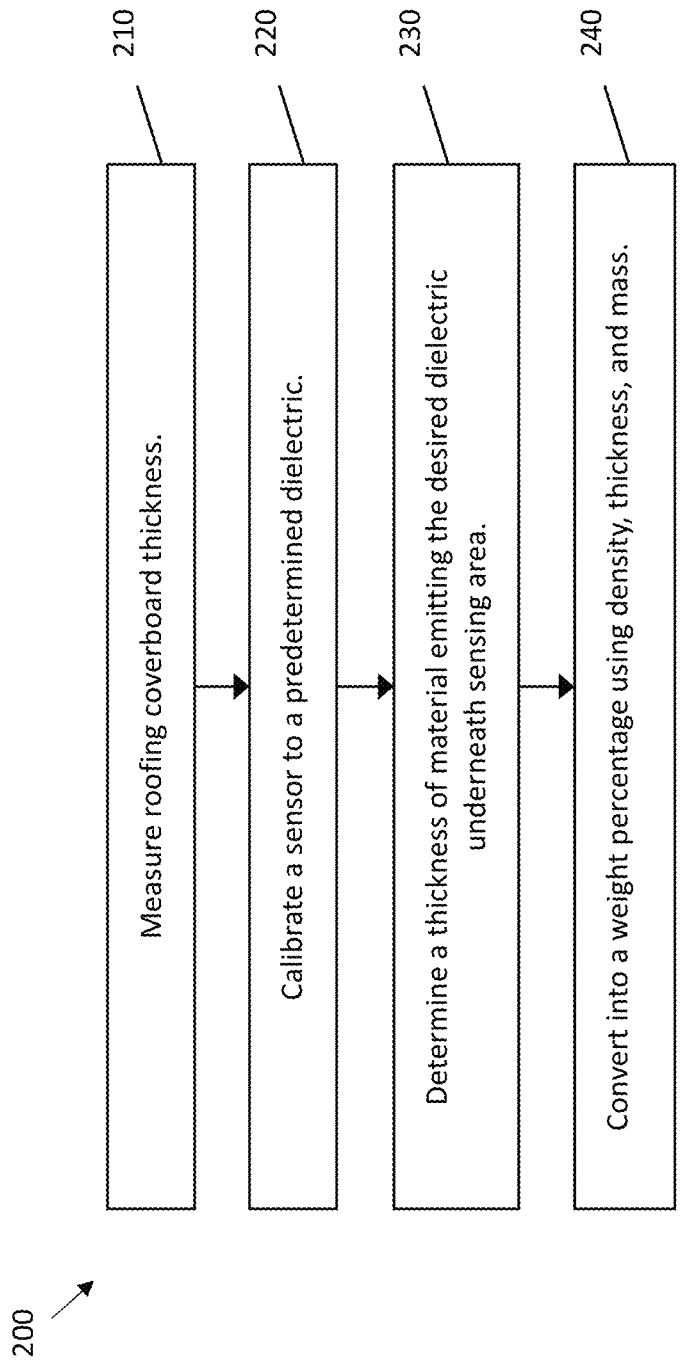
FIG. 2 is an example flow diagram of a non-destructive test method to analyze the cellulose and/or plastic content in a given board sample using capacitive sensors, in accordance with some embodiments of the present disclosure.

FIG. 2 illustrates a method 200 for a non-destructive test to analyze the cellulose and/or plastic content in a given composite sample using capacitive sensors. The method 200 can be performed by the system 100A or the system 100B. In some embodiments, the method 200 can have greater, fewer, or different operations.

In an operation 210, the composite thickness is measured. Then, in an operation 220, a displacement-type capacitive sensor is calibrated to a material that has a characteristic dielectric constant. In an operation 230, the thickness of a standard material sample that is emitting a known dielectric response underneath the sensing area is determined. Then, in an operation 240, this thickness value is converted into a weight percentage of cellulose or plastic using measured values for the sample density, thickness, and mass.

Figure 4:
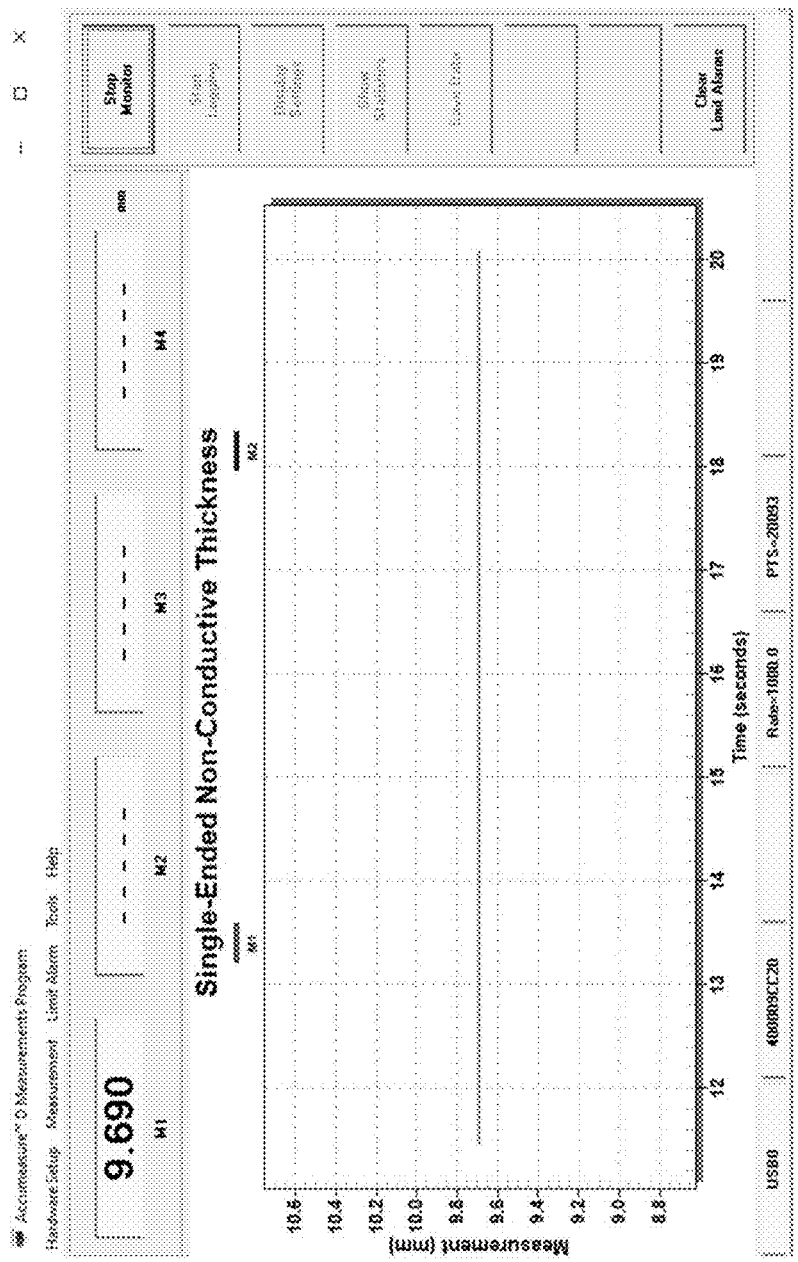
FIG. 4 is an example graphical user interface (GUI) display showing an output for a non-destructive test method of a 9.69 mm plastic sample, in accordance with some embodiments of the present disclosure.

Example 1. 9.69 mm Polyethylene Sample. By way of example, a composite plastic panel can be 6.01 inch (152.6 mm) by 2.96 inch (75.18 mm). In an example implementation of the method described with reference to FIG. 2, the composite panel thickness is measured to be 9.69 mm (operation 210). A thickness of 9.69 mm plastic material emitting the desired dielectric underneath sensing area is determined (operation 230). Then, the percentage plastic by volume and percentage plastic by weight are determined as shown below:

Let:
$V_p$ = Volume of plastic
$t_b$ = thickness of composite board
$t_p$ = thickness of plastic
$l_b$ = length of composite board
$l_p$ = length of plastic
$w_b$ = width of composite board
$w_p$ = width of plastic
$W_b$ = weight of composite board
$W_p$ = weight of plastic $$V_p\% = \frac{t_p \times l_p \times w_p}{t_b \times l_b \times w_b} \times 100 =$$

$$\frac{9.69 \text{ mm} \times 152.6 \text{ mm} \times 75.18 \text{ mm}}{9.69 \text{ mm} \times 152.6 \text{ mm} \times 75.18 \text{ mm}} \times 100 = 100\% \text{ plastic by volume}$$

where $V_p$% is the percentage of plastic by volume, $t_p$ is the thickness of the plastic as determined by the sensor and $t_b$ is the thickness of the board, and $$W_p\% = \frac{\rho_p \times t_p \times l_p \times w_p \times 100}{W_b}$$

$$W_p\% = \frac{\frac{0.92 \text{ g}}{\text{cm}^3} \times 0.969 \text{ m cm} \times 15.26 \text{ cm} \times 7.518 \text{ cm} \times 100}{102.74 \text{ g}} = 99.55\%$$

where $W_p$% is the percentage of plastic by weight, $\rho_p$=0.92 g/cm3 is the density of polyethylene, $w_b$ is the width of the sample, $l_b$ is the length of the sample. FIG. 4 illustrates an example graphical user interface (GUI) display showing an output for a non-destructive test method of the 9.69 mm plastic sample.

Example 2. 12.60 mm Polyethylene Sample. By way of example, a composite plastic panel can be 5.97 inch (151.6 mm) by 2.98 inch (75.69 mm). In an example implementation of the method described with reference to FIG. 2, the composite panel thickness is measured to be 12.60 mm (operation 210). A thickness of 12.60 mm plastic material emitting the desired dielectric underneath sensing area is determined (operation 230). Then, the percentage plastic by volume and percentage plastic by weight are determined as shown below:

$$V_p\% = \frac{t_p \times l_p \times w_p}{t_b \times l_b \times w_b} \times 100 =$$

$$\frac{12.60 \text{ mm} \times 151.6 \text{ mm} \times 75.69 \text{ mm}}{12.60 \text{ mm} \times 151.6 \text{ mm} \times 75.69 \text{ mm}} \times 100 = 100\% \text{ plastic by volume}$$

where $V_p$% is the percentage of plastic by volume, $t_p$ is the thickness of the plastic as determined by the sensor and $t_b$ is the thickness of the board, and $$W_p\% = \frac{\rho_p \times t_p \times l_p \times w_p \times 100}{W_b}$$

$$W_p\% = \frac{\frac{0.92 \text{ g}}{\text{cm}^3} \times 1.260 \text{ cm} \times 15.16 \text{ cm} \times 7.569 \text{ cm} \times 100}{133.30 \text{ g}} = 99.79\%$$

where $W_p$% is the percentage of plastic by weight, $\rho_p$=0.92 g/cm3 is the density of polyethylene, $w_b$ is the width of the sample, $l_b$ is the length of the sample.

Figure 5:
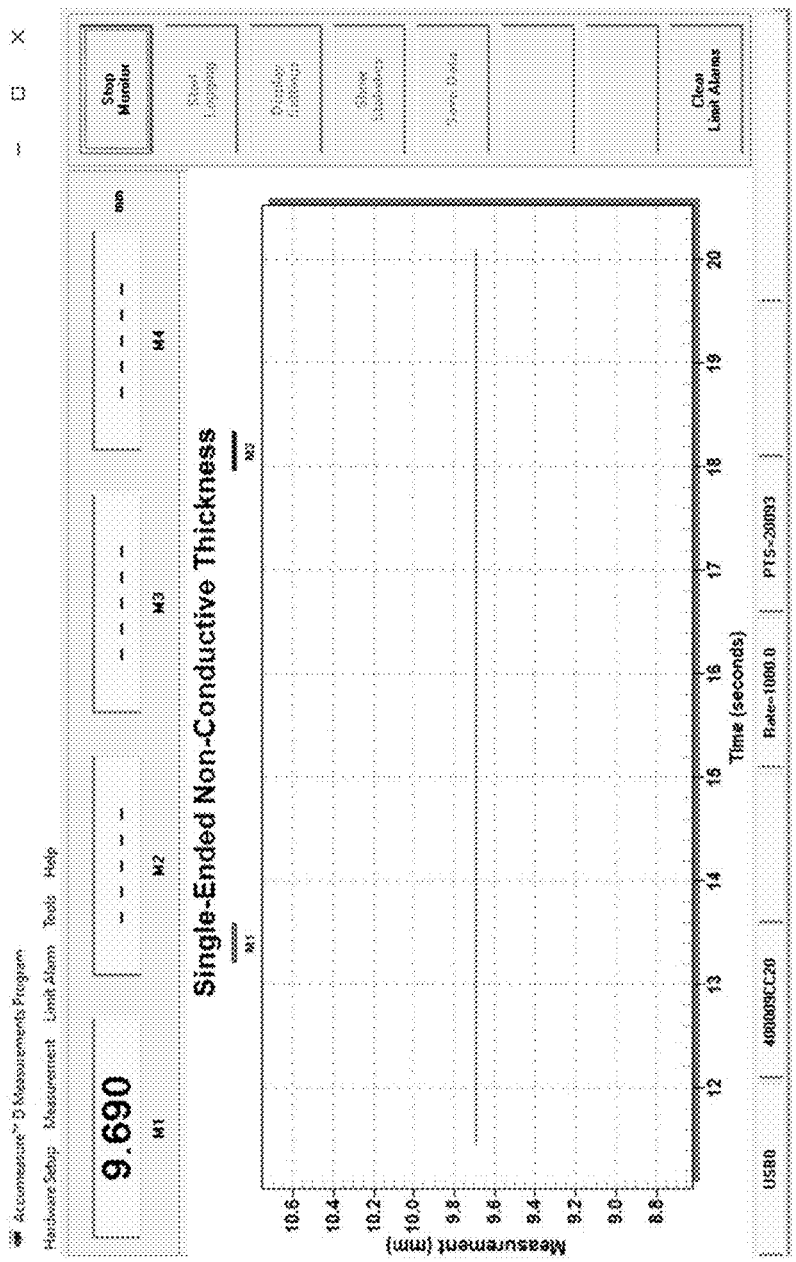
FIG. 5 is an example GUI display showing an output for a non-destructive test method of a 12.60 mm plastic sample, in accordance with some embodiments of the present disclosure.

0.92 g/cm3 is the density of polyethylene, $w_b$ is the width of the sample, $l_b$ is the length of the sample. FIG. 5 illustrates an example GUI display showing an output for a non-destructive test method of the 12.60 mm plastic sample.

Figure 6:
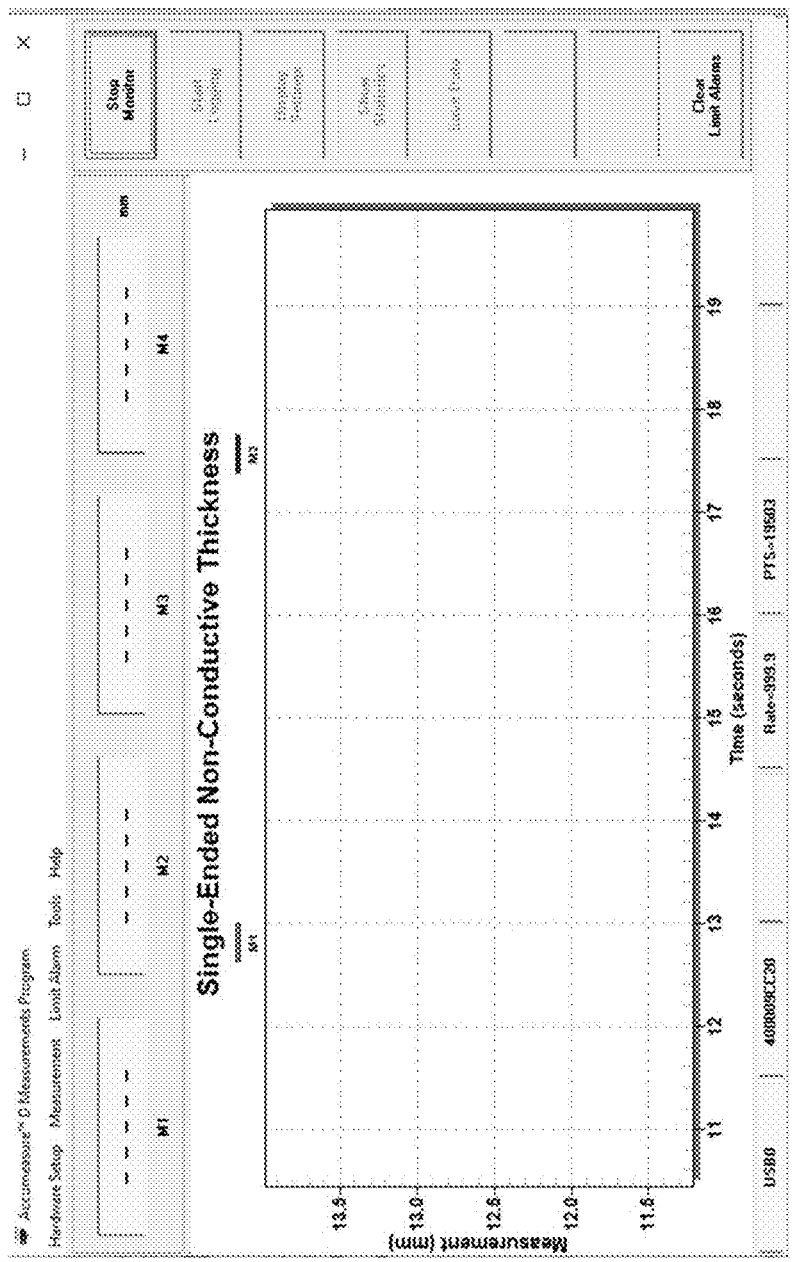
FIG. 6 is an example GUI display showing an output for a non-destructive test method of a paper pad sample, in accordance with some embodiments of the present disclosure.

Example 3. 11.89 mm Paper Sample calibrated to plastic. By way of example 3, a composite paper pad can be 2.99 inch (75.95 mm) by 2.96 inch (75.184 mm). In an example implementation of the method described with reference to FIG. 2, the composite pad thickness is measured to be 11.89 mm (operation 210). A thickness of 0 mm plastic material emitting the desired dielectric underneath sensing area is determined (operation 230). Then, the percentage plastic by volume and percentage plastic by weight are determined as shown below:

$$V_p\% = \frac{t_p \times l_p \times w_p}{t_b \times l_b \times w_b} \times 100 =$$

$$\frac{0 \text{ mm} \times 75.95 \text{ mm} \times 75.184 \text{ mm}}{11.89 \text{ mm} \times 75.95 \text{ mm} \times 75.184 \text{ mm}} \times 100 = 0\% \text{ plastic by volume}$$

where $V_p\%$ is the percentage of plastic by volume, $t_p$ is the thickness of the plastic as determined by the sensor and $t_b$ is the thickness of the board, and $$W_p\% = \frac{\rho_p \times t_p \times l_p \times w_p \times 100}{W_b}$$

$$W_p\% = \frac{0.92 \frac{g}{cm^3} \times 0 \text{ cm} \times 7.595 \text{ cm} \times 7.5184 \text{ cm} \times 100}{53.55 \text{ g}} = 0\%$$

where $W_p\%$ is the percentage of plastic by weight, $\rho_p$=0.92 g/cm3 is the density of polyethylene, $w_b$ is the width of the sample, $l_b$ is the length of the sample. FIG. 6 illustrates an example GUI display showing an output for a non-destructive test method of the paper pad sample.

Example 4. Coverboard Composite composed of Grade 52 recycled poly coated paper and plastic films Calibration with cellulose of 3.7 dielectric constant. By way of example, a composite coverboard sample derived from Grade 52 cartons, which consists of liquid packaging board containers including empty and used. These food grade cartons are polyethylene (PE)-coated paper with an oxygen barrier layer containing aluminum. Aseptic packaging contains around 70% bleached chemical fiber, 6% aluminum foil, and 24% PE film, according to Recyclingmarkets.net. In order to reach the plastic to paper ratio specification established by the company, an additional 10% of various grades of LDPE are combined with the raw material to produce a composited coverboard sample. The presumed cellulose and plastic levels are 63.6% bleached chemical fiber and 30.94% PE film. This board is 5.92 inch (150.33 mm) by 2.98 inch (75.58 mm). In an example implementation of the method described with reference to FIG. 2, the composite coverboard is measured to be 10.80 mm (operation 210). A thickness of 7.989 mm paper material emitting the desired dielectric underneath sensing area is determined (operation 230). Then, the percentage paper by volume and percentage paper by weight are determined as shown below:

$$V_p\% = \frac{t_p \times l_p \times w_p}{t_b \times l_b \times w_b} \times 100 =$$

$$\frac{7.989 \text{ mm} \times 75.58 \text{ mm} \times 150.33 \text{ mm}}{10.80 \text{ mm} \times 75.58 \text{ mm} \times 150.33 \text{ mm}} \times 100 = 73.97\% \text{ paper by volume}$$

where $V_p\%$ is the percentage of plastic by volume, $t_p$ is the thickness of the plastic as determined by the sensor and $t_b$ is the thickness of the board, and $$W_p\% = \frac{\rho_p \times t_p \times l_p \times w_p \times 100}{W_b}$$

$$W_p\% = \frac{0.789 \frac{g}{cm^3} \times 0.7989 \text{ cm} \times 7.558 \text{ cm} \times 15.033 \text{ cm} \times 100}{112.77 \text{ g}} = 63.51\% \text{ paper}$$

where $W_p\%$ is the percentage of paper by weight, $\rho_p$=0.789 g/cm3 is the density of paper (which was calculated from data shown in Example 3), $w_b$ is the width of the sample, $l_b$ is the length of the sample.

Figure 7:
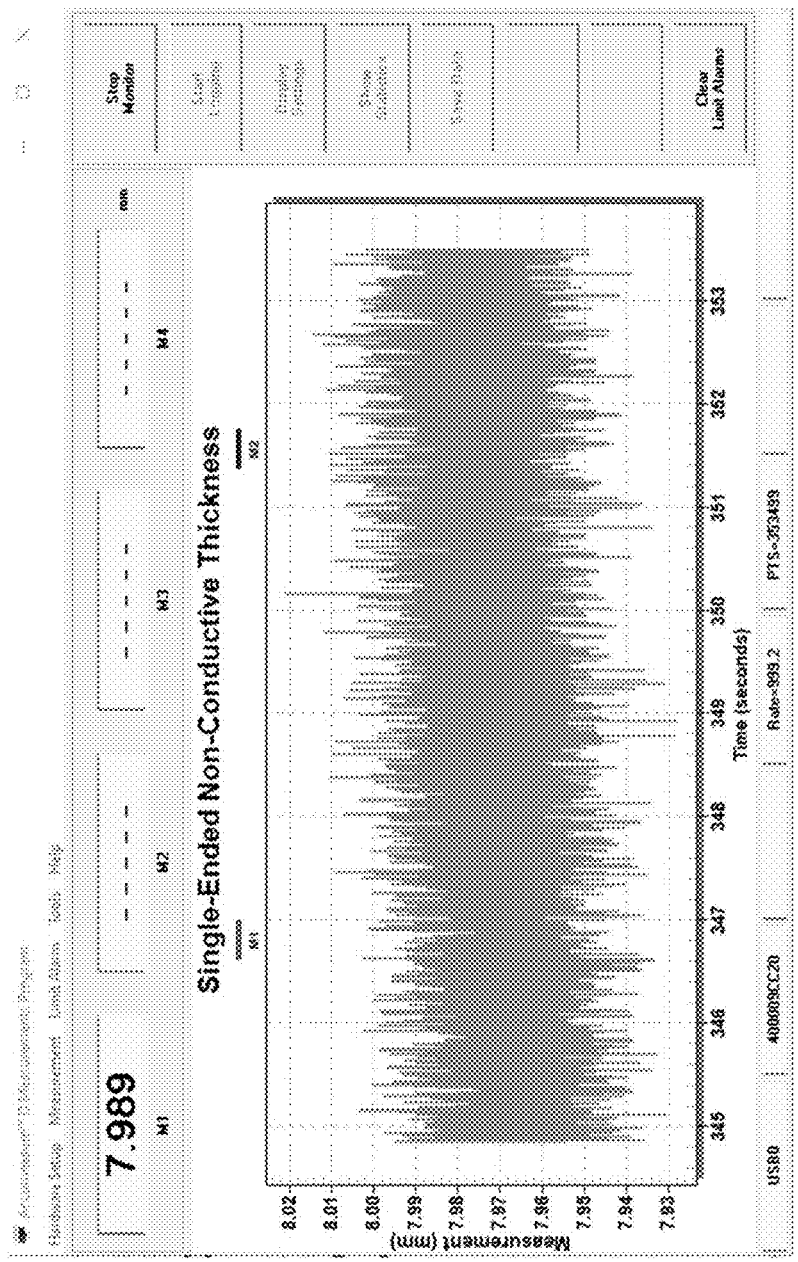
FIG. 7 is an example GUI display showing an output for a non-destructive test method of a grade 52 calibrated to paper sample, in accordance with some embodiments of the present disclosure.

A 10% plastic addition to the Grade 52 cartons should yield a 63.6% level of paper (100%×70%/110%), which is very close to the experimentally determined paper value of 63.5%. FIG. 7 illustrates an example GUI display showing an output for a non-destructive test method of the grade 52 calibrated to paper sample.

Figure 8:
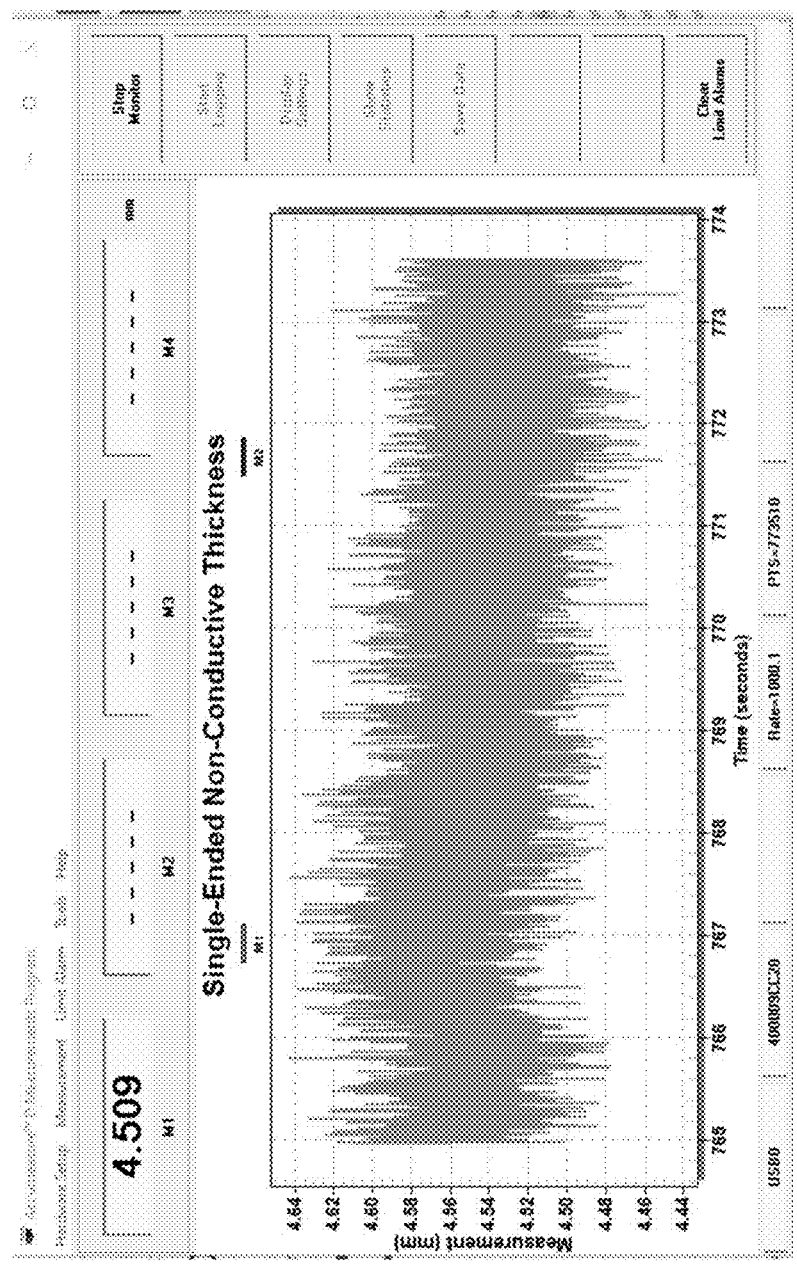
FIG. 8 is an example GUI display showing an output for a non-destructive test method of a municipal solid waste sample, in accordance with some embodiments of the present disclosure.

Example 5. Coverboard Composite composed of Municipal Solid Waste and Plastic Films Municipal solid waste can be processed to collect valuable material to produce a finished composite product. For this example, municipal solid waste sample is composed of unknown cellulose, polyethylene and polypropylene. The composite coverboard sample can be 1.98 inch (50.33 mm) by 1.96 inch (49.87 mm). In an example implementation of the method described with reference to FIG. 2, the composite coverboard is measured to be 10.51 mm (operation 210). A thickness of 5.51 mm plastic material emitting the desired dielectric underneath sensing area is determined (operation 230). Then, the percentage plastic by volume and percentage plastic by weight are determined as shown below:

$$V_p\% = \frac{t_p \times l_p \times w_p}{t_b \times l_b \times w_b} \times 100 =$$

$$\frac{4.509 \text{ mm} \times 52.46 \text{ mm} \times 50.67 \text{ mm}}{11.80 \text{ mm} \times 52.46 \text{ mm} \times 50.67 \text{ mm}} \times 100 = 38.21\% \text{ plastic by volume}$$

where $V_p\%$ is the percentage of plastic by volume, $t_p$ is the thickness of the plastic as determined by the sensor and $t_b$ is the thickness of the board, and $$W_p\% = \frac{\rho_p \times t_p \times l_p \times w_p \times 100}{W_b}$$

$$W_p\% = \frac{0.92 \frac{g}{cm^3} \times 0.4509 \text{ cm} \times 5.246 \text{ cm} \times 5.067 \text{ cm} \times 100}{26.24 \text{ g}} = 42.02\%$$

where $W_p\%$ is the percentage of plastic by weight, $\rho_p$=0.92 g/cm3 is the density of polyethylene, $w_b$ is the width of the sample, $l_b$ is the length of the sample. FIG. 8 illustrates an example GUI display showing an output for a non-destructive test method of the municipal solid waste sample.

Figure 3:
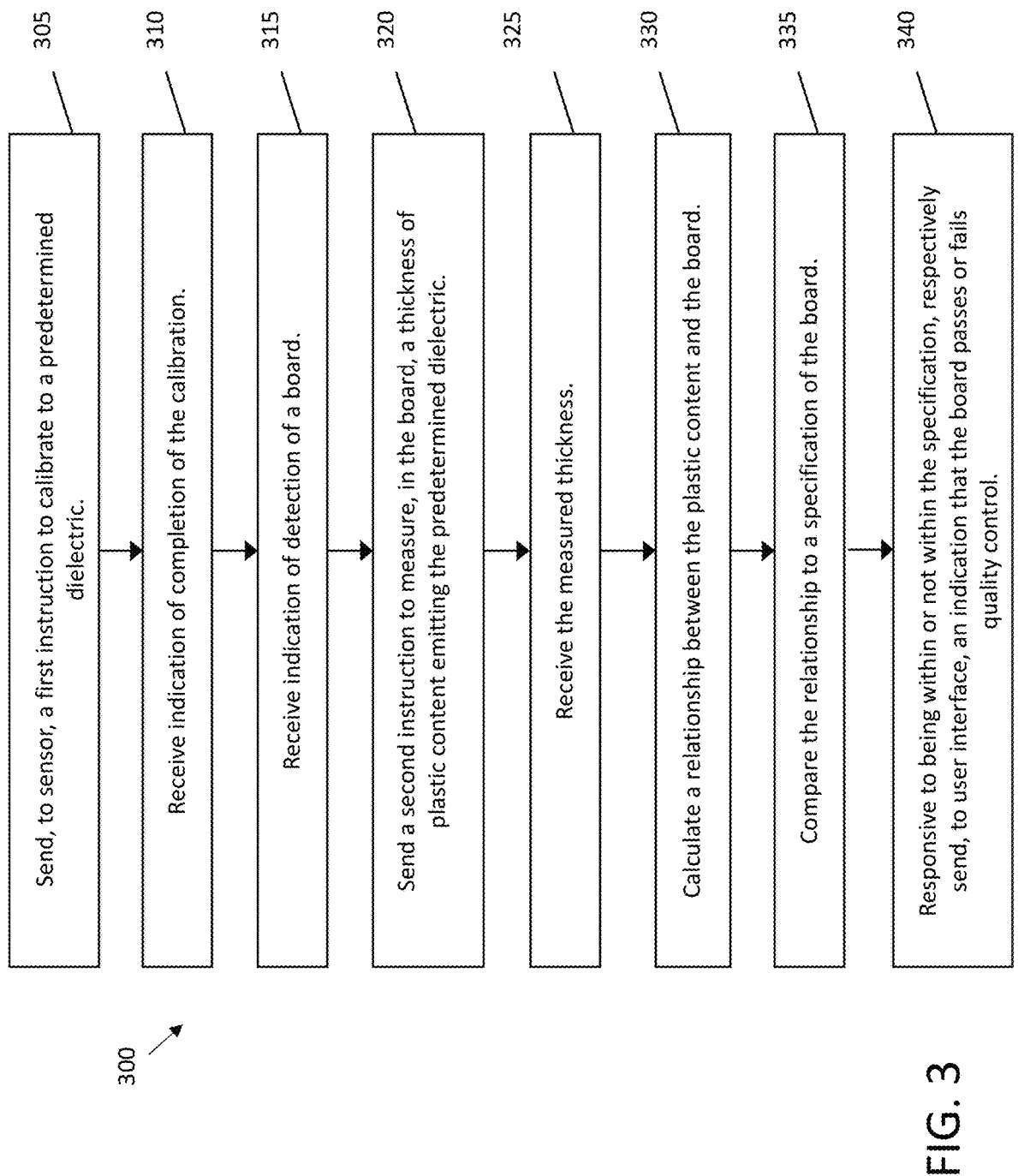
FIG. 3 is an example flow diagram of a non-destructive method to analyze the cellulose and/or plastic content in a given board sample using capacitive sensors, in accordance with some embodiments of the present disclosure.

FIG. 3 illustrates a method 300 for a non-destructive test to analyze the cellulose and/or plastic content in a given board sample using capacitive sensors. The method 300 can be performed by the processor 130. The method 300 can be performed by the system 100A or the system 100B. In some embodiments, the method 300 can have greater, fewer, or different operations. Operations of the method 300 can be combined with operations of the method 200.

In an operation 305, a processor (e.g., the processor 130) sends, to a displacement-type capacitive sensor (e.g., the sensor 110) an instruction to calibrate to a predetermined dielectric. In an operation 310, the process receives, from the sensor, an indication that the calibration is complete. In some embodiments, a quality control engineer places the board underneath the sensor (e.g., in between the sensor and the ground plate 120). In an operation 315, the sensor receives an indication that a board has been detected by the sensor. In an operation 320, the processor sends, to the sensor an instruction to measure, in the composite material board, an equivalent thickness of a cellulose or plastic emitting from the sample (dielectric). In an operation 325, the processor receives, from the sensor, the measured equivalent thickness of cellulose or plastic in the sample.

In an operation 330, the processor calculates a relationship between the cellulose and/or plastic content and the composite material board. For example, the processor calculates total cellulose or plastic content percentage in the board by volume or a percentage of cellulose or plastic content in the board by weight. In some embodiments, the processor stores the thickness and other parameters in a database or document (e.g., excel workbook), receives a formula for calculating from the database, calculates the relationship, and stores the relationship in the database. In an operation 335, the processor compares the relationship to a specification of the board. In some embodiments, the specification is stored in memory or storage. In some embodiments, the processor receives the specification from a user interface (e.g., the user interface 140). In an operation 340, responsive to being within or not within the specification, the processor respectively sends, to the user interface, an indication that the board passes or fails quality control (e.g., meets or fails to meet the specification).

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, unless otherwise noted, the use of the words "approximate," "about," "around," "substantially," etc., mean plus or minus ten percent.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed is:

1. A system comprising:
a ground plate located on a production line on which a composite material board is manufactured, wherein the composite material board is a roofing coverboard manufactured at least in part using a first material and a second material from a waste stream;
a displacement-type capacitive sensor probe; and
a processor with programmed instructions to:
calibrate the displacement-type capacitive sensor probe to a predetermined dielectric constant;
determine, using the sensor probe, a capacitance of the composite material board;
determine, in the composite material board placed in between the displacement-type capacitive sensor probe and the ground plate, using the determined capacitance, an equivalent thickness of the first material of the waste stream having the predetermined dielectric constant by comparing the capacitance of the composite material board to a known capacitive response of one or more thicknesses of the first material, wherein the equivalent thickness is less than a thickness of the composite material board; and
convert the equivalent thickness of the first material into a weight percentage of the first material in the composite material board, based on the thickness of the composite material board.

2. The system of claim 1, wherein the first material is plastic or cellulose and the predetermined dielectric is a dielectric of various plastics or cellulose.

3. The system of claim 1, wherein the weight percentage is determined based on the equivalent thickness of the first material, a density of the first material, a width of the composite material board, a length of the composite material board, and a weight of the composite material board.

4. The system of claim 1, wherein the processor is further programmed to indicate that, responsive to the weight percentage being within or not within a specification of the composite material board, the composite material board is approved or rejected for customer shipment.

5. The system of claim 1, wherein the composite material board includes polyethylene.

6. The system of claim 1, wherein the composite material board includes cellulose.

7. A system comprising:
a displacement-type capacitive sensor probe;
a ground plate located on a production line on which a composite material board is manufactured, wherein the composite material board is a roofing coverboard manufactured at least in part using cellulose and plastic from a waste stream; and
a processor with programmed instructions to:
send, to the displacement-type capacitive sensor probe, an instruction to measure a capacitance of the composite material board placed between the displacement-type capacitive sensor and the ground plate;
determine, based on the determined capacitance, an equivalent thickness of cellulose or plastic in the composite material board by comparing the determined capacitance of the composite material board to a known capacitive response of one or more thicknesses of cellulose or a known capacitive response of one or more thicknesses of plastic, wherein the equivalent thickness is less than a thickness of the composite material board;
calculate a proportion of the cellulose or plastic content in the composite material board, based on the equivalent thickness and the thickness of the composite material board;
compare the proportion to a specification of the composite material board; and
responsive to the proportion being within or not within the specification, send, to a user interface coupled to the processor, an indication that the composite material board respectively passes or fails quality control.

8. The system of claim 7, wherein the processor is further programmed to calibrate the displacement-type capacitive sensor probe to a dielectric constant.

9. The system of claim 8, the processor with further programmed instructions to send, to the displacement-type capacitive sensor probe, a second instruction to calibrate to the dielectric constant.

10. The system of claim 9, the processor with further programmed instructions to receive indication of completion of the calibration.

11. The system of claim 7, the processor with further programmed instructions to receive indication of detection of the composite material board.

12. The system of claim 7, wherein the proportion is a percentage of cellulose or plastic content in the composite material board by weight.

13. The system of claim 7, wherein the proportion is a percentage of cellulose or plastic content in the composite material board by volume.

14. The system of claim 7, wherein the composite material board includes any one of municipal solid waste residuals, mixed recycled paper and plastic, and other combinations of recycled or virgin papers and plastics.

15. The system of claim 7, wherein the processor is programed to send a volume percentage of the cellulose or plastic content to a user interface.

16. A computer-implemented method comprising:
sending, by a processor and to a displacement-type capacitive sensor coupled to the processor, an instruction to measure a capacitance of a composite material board placed underneath the displacement-type capacitive sensor located on a production line on which the composite material board is manufactured, wherein the composite material board is a roofing coverboard manufactured at least in part using plastic content and cellulose content of a waste stream;
determining, by the processor, based on the determined capacitance, an equivalent thickness of the plastic content having a dielectric constant by comparing the capacitance of the composite material board to a known capacitive response of one or more thicknesses of the plastic content, wherein the equivalent thickness is less than a thickness of the composite material board;
calculating, by the processor, a proportion of the cellulose or plastic content in the composite material board;
comparing, by the processor, the proportion to a specification of the composite material board; and
responsive to the proportion being within or not within the specification, sending, to a user interface coupled to the processor, an indication that the composite material board respectively meets or fails to meet the specification.

17. The method of claim 16, wherein the displacement-type capacitive sensor calibrates to the dielectric constant.

18. The method of claim 16, the method further comprising sending, to the displacement-type capacitive sensor, a second instruction to calibrate to the dielectric constant.

19. The method of claim 18, further comprising receiving indication of completion of the calibration.

20. The method of claim 16, further comprising receiving indication of detection of the composite material board.

21. The method of claim 16, wherein the relationship is one or more of a percentage of weight of the plastic content in the board or a percentage of volume of the plastic content in the composite material board.

* * * * *